United States Patent
Dhatchinamoorthy et al.

(10) Patent No.: US 11,665,046 B2
(45) Date of Patent: May 30, 2023

(54) FAILOVER PORT FORWARDING BETWEEN PEER STORAGE NODES

(71) Applicant: Western Digital Technologies, Inc., San Jose, CA (US)

(72) Inventors: Rahul Gandhi Dhatchinamoorthy, Bangalore (IN); Kumar Ranjan, Bangalore (IN); Senthil Kumar Veluswamy, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/182,784

(22) Filed: Feb. 23, 2021

(65) Prior Publication Data

US 2022/0231905 A1    Jul. 21, 2022

Related U.S. Application Data

(60) Provisional application No. 63/138,061, filed on Jan. 15, 2021.

(51) Int. Cl.
   *H04L 41/0668* (2022.01)
   *H04L 41/0659* (2022.01)
   *H04L 41/0631* (2022.01)
   *H04L 67/104* (2022.01)

(52) U.S. Cl.
   CPC ........ *H04L 41/0668* (2013.01); *H04L 41/065* (2013.01); *H04L 41/0659* (2013.01); *H04L 67/1048* (2013.01)

(58) Field of Classification Search
   None
   See application file for complete search history.

(56) References Cited

U.S. PATENT DOCUMENTS

| | | | |
|---|---|---|---|
| 8,909,980 B1 * | 12/2014 | Lewis | G06F 3/067 714/4.11 |
| 8,949,656 B1 * | 2/2015 | Ninan | G06F 11/2005 714/4.11 |
| 9,594,653 B1 * | 3/2017 | Misra | G06F 11/2092 |
| 9,747,249 B2 | 8/2017 | Cherian et al. | |
| 9,817,732 B1 * | 11/2017 | Fair | G06F 11/2007 |
| 9,940,073 B1 * | 4/2018 | Thangapalam | G06F 3/0685 |
| 10,423,609 B1 * | 9/2019 | Strauss | G06F 16/128 |
| 10,509,764 B1 | 12/2019 | Izenberg et al. | |
| 11,442,652 B1 * | 9/2022 | Dailey | G06F 3/0647 |
| 2009/0259666 A1 * | 10/2009 | Tola | H04L 67/2857 709/204 |
| 2015/0006949 A1 * | 1/2015 | Bittles | G06F 11/2028 714/4.11 |
| 2015/0006951 A1 * | 1/2015 | Gurram | G06F 11/2028 714/4.12 |
| 2015/0121134 A1 * | 4/2015 | Wipfel | G06F 11/2094 714/6.31 |

(Continued)

*Primary Examiner* — Kenny S Lin
(74) *Attorney, Agent, or Firm* — Patent Law Works LLP

(57) ABSTRACT

Systems and methods for failover port forwarding between peer storage nodes are described. Storage nodes may include separate data ports for host network communication and peer network communication. In the event of host port failure, host nodes may be configured to send failover storage requests to a different storage node and that storage node may forward the failover storage request through the peer ports to reach the target storage node.

20 Claims, 7 Drawing Sheets

(56) References Cited

U.S. PATENT DOCUMENTS

| | | | |
|---|---|---|---|
| 2015/0172111 A1* | 6/2015 | Lalsangi | H04L 67/01 |
| | | | 709/220 |
| 2016/0179637 A1* | 6/2016 | Winokur | G06F 13/4221 |
| | | | 714/5.1 |
| 2016/0328303 A1* | 11/2016 | Brandner | G06F 11/1662 |
| 2016/0342335 A1* | 11/2016 | Dey | G06F 3/065 |

* cited by examiner

FAILOVER PORT FORWARDING BETWEEN PEER STORAGE NODES

TECHNICAL FIELD

The present disclosure generally relates to distributed data storage systems and, more particularly, to backup data paths for host communication with storage nodes.

BACKGROUND

Data storage systems may be configured in a flexible way such that, for example, storage capacity can be added or removed in function of the host needs, without degrading the performance as the system grows. This makes such distributed storage systems excellent candidates for large scale storage systems.

Multi-device storage systems utilize multiple discrete data storage devices, such as solid-state drives, hard disk drives, hybrid drives, tape drives, etc., for storing large quantities of data. These multi-device storage systems are generally arranged in an array of data storage devices interconnected by a common communication fabric and, in many cases, controlled by a storage controller, redundant array of independent disks (RAID) controller, or general controller, for coordinating storage and system activities across the array of drives. The data stored in the array may be stored according to a defined RAID level, a combination of RAID schemas, or other configurations for providing desired data redundancy, performance, and capacity utilization. In general, these data storage configurations may involve some combination of redundant copies (mirroring), data striping, and/or parity (calculation and storage), and may incorporate other data management, error correction, and data recovery processes, sometimes specific to the type of disk drives being used (e.g., solid-state drives versus hard disk drives).

Some multi-device storage systems employ data storage devices capable of communicating with one another and/or host systems over the interconnecting fabric and/or network fabric. Such fabric-based distributed storage systems may include storage devices configured with direct memory access to enable more efficient transfer of data to and from host and other systems. Reducing communication, data transfer, processing, and/or data management at the storage control plane (such as various levels of storage controllers) may reduce bottlenecks and improve scalability as the number and capacity of storage devices increases. Various standards have been defined for enabling host software and systems to communicate with storage subsystems, such as non-volatile memory subsystems or solid-state drives (SSDs). An example standard may include Non-Volatile Memory Express (NVMe) over Fabrics (NVMe-oF).

In some storage systems, data storage devices may be arranged in storage nodes, such as storage blades. Each storage node may include at least one host port for connecting to a host network for data transfer. In the event of a host port failure, host connections to the storage node with the compromised host port may be lost, causing system disruptions and delays.

A configuration to enable secondary storage input/output paths for storage nodes without adding additional hardware or redundancy may be advantageous. Alternate storage paths through existing storage system resources may be needed.

SUMMARY

Various aspects for failover port forwarding between peer storage nodes, particularly using a peer network accessed by forwarding storage requests through another storage node, are described.

One general aspect includes a system including a first storage node that includes: a first data port; a second data port; a first fabric service; and a port forwarding service. The first fabric service is configured to: communicate, through the first data port, with a plurality of peer storage nodes over a peer network; and communicate, through the second data port, with at least one host node over a host network. The port forwarding service is configured to: receive a failover storage request for a target storage node in the plurality of peer storage nodes; and forward the failover storage request to the target storage node.

Implementations may include one or more of the following features. The first storage node may be configured to receive the failover storage request through the second data port and the first storage node may be configured to forward the failover storage request through the first data port. The first storage node may further include: a network interface controller that includes a storage node processor and a storage node memory configured to store, for execution by the storage node processor, the first fabric service and the port forwarding service; and a plurality of data storage devices configured to receive storage requests through the network interface controller. The system may include the plurality of peer storage nodes configured to communicate over the peer network using a first network protocol; the peer network configured to access a first set of data ports in the plurality of peer storage nodes, where the peer network is configured as a logically independent network from the host network; and a host network switch configured to connect to a second set of data ports in the plurality of peer storage nodes and provide access to the host network for the plurality of peer storage nodes. The first fabric service may be further configured to: determine a destination address for the failover storage request; determine the destination address is not the first storage node; and forward the failover storage request to the destination address through the first data port. The destination address may correspond to a network address for the target storage node on the peer network. The system may further include a host node and the host node may include: a host processor; a host memory; a host fabric service configured to communicate with the first storage node over the host network; and a storage service configured to send storage requests to at least one storage device in the target storage node. A first storage request from the storage service to the target storage node may fail and the host fabric service may be further configured to, responsive to the first storage request failing, send the failover storage request to the first storage node. The host fabric service may be further configured to: use a first port identifier corresponding to a host network port of the target storage node for the first storage request; and use a second port identifier corresponding to the second data port of the first storage node for the failover storage request. The host node may further include a multipath manager configured to: determine a unique identifier for the target storage node; and selectively rout storage requests to the target storage node using the first port identifier and the second port identifier based on an availability of the host network port corresponding to the first port identifier. The system may further comprise a management service configured to: determine fabric addresses for each storage node of the first storage node and the plurality of peer storage nodes; determine primary host port identifiers for each storage node of the first storage node and the plurality of peer storage nodes, where the primary host port identifier for each storage node corresponds to a host port of the storage node; and determine at least one failover port identifier for each storage node of the first storage node and the plurality of peer storage nodes, where the at least one failover port identifier corresponds to a host port of a different storage node. The first storage node and the plurality of peer storage nodes may be configured as storage blades in an enclosure; the management service may be further configured to populate, in at least one host node, a multipath configuration table including primary host port identifiers and at least one failover port identifier for at least one storage node of the first storage node and the plurality of peer storage nodes, and enable the port forwarding service in each storage node of the first storage node and the plurality of peer storage nodes; the at least one failover port identifier for the at least one storage node may include a plurality of failover port identifiers selected from the first storage node and the plurality of peer storage nodes; the at least one host node, the first storage node, and the plurality of peer storage nodes may be configured as fabric nodes using a fabric protocol for communication over the host network; and the first storage node and the plurality of peer storage nodes may be configured using a peer network protocol that is different from the fabric protocol for communication over the peer network.

Another general aspect includes a computer-implemented method that includes: establishing, by a first storage node and through a first data port, communication with a plurality of peer storage nodes over a peer network; establishing, by the first storage node and through a second data port, communication with at least one host node over a host network; receiving, by the first storage node, a failover storage request for a target storage node in the plurality of peer storage nodes; and forwarding, by the first storage node, the failover storage request to the target storage node.

Implementations may include one or more of the following features. The first storage node may receive the failover storage request through the second data port and the first storage node may forward the failover storage request through the first data port. The computer-implemented method may include connecting the first storage node and the plurality of peer storage nodes using a first set of data ports for the peer network, where the peer network is configured as a logically independent network from the host network; and connecting, to a host network switch, the first storage node and the plurality of peer storage nodes using a second set of data ports for the host network. The computer-implemented method may include determining, by the first storage node, a destination address for the failover storage request; determining, by the first storage node, the destination address is not the first storage node; and forwarding, by the first storage node, the failover storage request to the destination address through the first data port, the destination address corresponds to a network address for the target storage node on the peer network. The computer-implemented method may include: sending, from a host node, a first storage request to at least one storage device in the target storage node; determining, by the host node, a failure of the first storage request to the target storage node; and sending, by the host node and responsive to the failure of the first storage request, the failover storage request to the first storage node. Sending the first storage request may use a first port identifier corresponding to a host network port of the target storage node and sending the failover storage request may use a second port identifier corresponding to the second data port of the first storage node for the failover storage request. The computer-implemented method may include: determining, by the host node, a unique identifier for the target storage node; and selectively routing, by the host node, storage requests to the target storage node using the first port identifier and the second port identifier based on an availability of the host network port corresponding to the first port identifier. The computer-implemented method may include: determining fabric addresses for each storage node of the first storage node and the plurality of peer storage nodes; determining primary host port identifiers for each storage node of the first storage node and the plurality of peer storage nodes, where the primary host port identifier for each storage node corresponds to a host port of the storage node; and determining at least one failover port identifier for each storage node of the first storage node and the plurality of peer storage nodes, where the at least one failover port identifier corresponds to a host port of a different storage node. The computer-implemented method may include: populating, in at least one host node, a multipath configuration table including primary host port identifiers and at least one failover port identifier for at least one storage node of the first storage node and the plurality of peer storage nodes; and enabling the port forwarding service in each storage node of the first storage node and the plurality of peer storage nodes.

Still another general aspect includes a storage system including: a plurality of peer storage nodes configured to communicate with each other peer storage node of the plurality of peer storage nodes using a peer network and a first set of data ports in the plurality of peer storage nodes; at least one host node configured to communicate with the plurality of peer storage nodes using a host network and a second set of data ports in the plurality of peer storage nodes; means for sending, from the at least one host node, a storage request to a target storage node of the plurality of peer storage nodes; means for determining a failure of the storage request to the target storage node; means for sending, responsive to the failure of the storage request, a failover storage request to a different storage node of the plurality of peer storage nodes; means for receiving, by the different storage node of the plurality of peer storage nodes, the failover storage request for the target storage node in the plurality of peer storage nodes; and means for forwarding, by the different storage node, the failover storage request to the target storage node.

The various embodiments advantageously apply the teachings of storage networks and/or storage systems to improve the functionality of such computer systems. The various embodiments include operations to overcome or at least reduce the issues previously encountered on the storage networks and/or systems and, accordingly, are more reliable and/or cost-effective than other computing networks. That is, the various embodiments disclosed herein include hardware and/or software with functionality to improve the available host data paths for failover storage input/output (I/O) requests, such as by using port forwarding to route host I/O traffic through other storage nodes and an interconnecting peer network when the host port fails. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Figure 1:
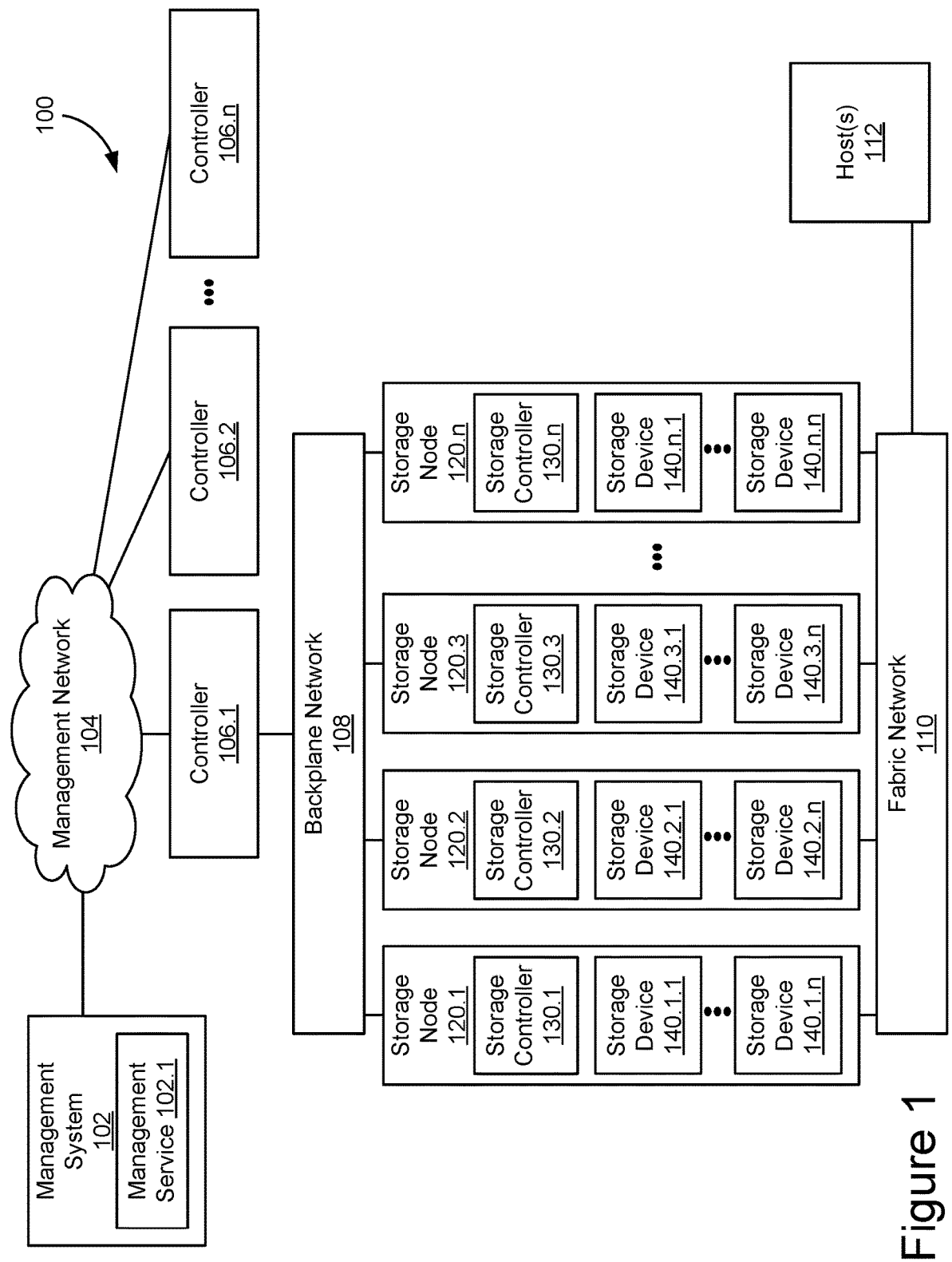
FIG. 1 schematically illustrates a storage system with a fabric network and a backplane network.

FIG. 1 shows an embodiment of an example data storage system 100 with fabric connected data storage devices 140. While some example features are illustrated, various other features have not been illustrated for the sake of brevity and so as not to obscure pertinent aspects of the example embodiments disclosed herein. To that end, as a non-limiting example, data storage system 100 includes one or more data storage devices 140 (also sometimes called information storage devices, storage devices, or drives) configured in storage nodes 120. In some embodiments, storage nodes 120 may be configured as blades or similar storage units for use in data center storage racks, chassis, or enclosures. Storage nodes 120 may be supported by a management system 102 and provide data storage and retrieval capabilities for host systems 112. In some embodiments, storage nodes 120 may be configured in a storage hierarchy that includes controllers 106. Each controller 106 may be responsible for a corresponding set of storage nodes and storage devices connected through a corresponding backplane network, though only storage nodes 120 and storage devices 140 for controller 106.1 are shown.

In the embodiment shown, each storage node 120 includes a number of storage devices 140 attached to a common fabric network 110. For example, storage devices 140 may include a number of disk drives arranged in a storage array, such as storage devices sharing a common rack or unit in a data center. In some embodiments, storage devices 140 may share backplane network 108, network switch(es), and/or other hardware and software components. For example, backplane network 108 and fabric network 110 may include a plurality of physical port connections to storage nodes 120, storage controllers 130, and storage devices 140 that define physical, transport, and other logical channels for establishing communication with the different components and subcomponents thereof related to interconnect fabric 114. In some embodiments, backplane network 108 may provide a plurality of physical connections to storage nodes 120 via storage controllers 130 that enable management system 102 to manage storage nodes 120 via a management network 104 and controllers 106. These physical connections may include one or more ethernet connections and management network 104 may include a secure subnetwork through various network switches, network interfaces, and similar networking components.

Management system 102 may be configured as an application or module in an information technology (IT) management system running on a general-purpose computer, such as such as a personal computer, a laptop, a tablet, a wireless telephone, a personal digital assistant or any other type of communication device that is able to interface with the storage system 100 and/or operational data about storage system 100 over management network 104. In some embodiments, a management application and/or management service 102.1 may provide a dashboard for system maps, configuration information, operating data, system/component diagnostics, performance metrics, and/or status information for storage devices 140, storage controllers 130, storage nodes 120, controller nodes 106, etc. For example, management system 102 may include a web-based graphical user interface accessed through a web browser using secure internet protocols that accesses specific management functions of each of the components of storage system 100. In some embodiments, management service 102.1 may include a configuration utility for managing the configuration of storage devices 140, storage controllers 130, controllers 106, and other components of storage system 100 as fabric nodes accessible using fabric communication protocols and fabric subsystem addresses. Management service 102.1 may support a number of administrators with varying IT management responsibilities, including provisioning, maintenance, data management, equipment management, and related scheduling, costing, and project management. In some embodiments, management system 102 may include communication with and management functions for one or more host systems 112. For example, fabric connections through fabric network 110 and/or separate network (e.g., internet) connection may enable management service 102.1 to access or receive storage system management information from host systems 112 and/or access or modify configuration settings, such as fabric node configuration information.

Several storage nodes 120 can be grouped together with an associated controller 160, such as storage nodes 120.1-120.n sharing a backplane connection through backplane network 108 with controller 106.1. For example, these components may be housed in a single rack with associated backplane interfaces. Similarly, each controller 106.2-106.n may be associated with another rack and another set of storage nodes. These racks may not be required to be located at the same location. They may be geographically dispersed across different data centers. For example, controller 106.1 and associated storage nodes 120.1-120.n may be located in a rack at a data center in Europe, controller 106.2 and associated storage nodes may be located in a rack at a data center in the USA, and controller 106.n and associated storage nodes may be located in a rack at a data center in China. Similarly, these racks may be interconnected by a variety of network architectures and may include multiple network paths, global networks (e.g., internet), private networks, virtual networks, subnetworks, etc. and related networking equipment. These distributed rack components may be interconnected to management network 104 and/or fabric network 110.

In some embodiments, data storage devices 140 are, or include, solid-state drives (SSDs). Each data storage device 140.1.1-140.n.n may include a non-volatile memory (NVM) or device controller based on compute resources (processor and memory) and a plurality of NVM or media devices for data storage (e.g., one or more NVM device(s), such as one or more flash memory devices). In some embodiments, a respective data storage device 140 of the one or more data storage devices includes one or more NVM controllers, such as flash controllers or channel controllers (e.g., for storage devices having NVM devices in multiple memory channels). In some embodiments, data storage devices 140 may each be packaged in a housing, such as a multi-part sealed housing with a defined form factor and ports and/or connectors for interconnecting with backplane network 108 and/or fabric network 110 directly or through respective storage controllers 130 and associated hardware in storage nodes 120.

In some embodiments, a respective data storage device 140 may include a single medium device while in other embodiments the respective data storage device 140 includes a plurality of media devices. In some embodiments, media devices include NAND-type flash memory or NOR-type flash memory. In some embodiments, data storage device 140 includes one or more hard disk drives (HDDs). In some embodiments, data storage devices 140 may include a flash memory device, which in turn includes one or more flash memory die, one or more flash memory packages, one or more flash memory channels or the like. However, in some embodiments, one or more of the data storage devices 140 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In some embodiments, storage controllers 130 may be coupled to respective data storage devices 140 through an interface bus within each storage node 120. For example, each storage node may be configured as a storage blade or similar storage unit comprising a plurality of interface slots for storage devices 140. Storage controllers 130 may include NVMe-oF interface cards with interface ports for NVMe-oF compatible storage devices, such as storage devices with NVMe interfaces and onboard remote direct memory access (RDMA) engines. For example, storage controller 130.1 may be configured as a network interface controller, such as an RDMA network interface controller (RNIC) configured for NVMe-oF communication over fabric network 110 and RDMA over converged ethernet (ROCE) communication with other storage nodes 120 and their respective storage controllers 130 over backplane network 108. In some embodiments, storage controllers 130 and other components of storage system 100 may be configured for other protocols supporting fabric and/or RDMA communication, such as NVMe over transmission control protocol (NVMe-oTCP), iWARP, internet small computer serial interface (iSCSI) extensions for RDMA (iSER), etc.

In some embodiments, storage controllers 130 may be coupled to respective data storage devices 140 through backplane network 108 and/or fabric network 110. In some embodiments, storage controllers 130 may be hosted as a component and/or a subsystem of another component of data storage system 100. For example, in some embodiments, some or all of the functionality of storage controllers 130 may be implemented by software executed on one or more compute resources in at least one of data storage devices 140, backplane network 108, fabric network 110, and/or physical interfaces or networking components thereof. Storage controllers 130 and/or controllers 106 are sometimes called a controller system, a main controller system, a non-volatile memory express (NVMe) controller, garbage collection (GC) leader, or storage virtualization controller (SVC).

In some embodiments, host or host system 112 is coupled to data storage system 100 through a network interface that is part of host fabric network 110. In some embodiments, multiple host systems 112 (only one of which is shown in FIG. 1) are coupled to data storage system 100 through fabric network 110, which may include a storage network interface or other interface capable of supporting communications with multiple host systems 112. Fabric network 110 may include a wired and/or wireless network (e.g., public and/or private computer networks in any number and/or configuration) which may be coupled in a suitable way for transferring data. For example, fabric network 110 may include any means of a conventional data communication network such as a local area network (LAN), a wide area network (WAN), a telephone network, such as the public switched telephone network (PSTN), an intranet, the internet, or any other suitable communication network or combination of communication networks.

Host system 112, or a respective host in a system having multiple hosts, may be any suitable computer device, such as a computer, a computer server, a laptop computer, a tablet device, a netbook, an internet kiosk, a personal digital assistant, a mobile phone, a smart phone, a gaming device, or any other computing device. Host system 112 is sometimes called a host, client, or client system and may include at least one host processor and host memory. In some embodiments, host system 112 is a server system, such as a server system in a data center. In some embodiments, the one or more host systems 112 are one or more host devices distinct from controllers 106, storage nodes 120, storage controllers 130, and the plurality of storage devices 140. The one or more host systems 112 may be configured to store and access data in the plurality of storage devices 140.

In some embodiments, data storage system 100 includes one or more processors, one or more types of memory, a display and/or other user interface components such as a keyboard, a touch screen display, a mouse, a track-pad, and/or any number of supplemental devices to add functionality. In some embodiments, data storage system 100 does not have a display and other user interface components.

Fabric network 110 may include or employ one or more interfaces, routers, and physical connections to each component or subcomponent physically and logically connected to fabric network 110. Fabric network 110 may be defined in terms of fabric nodes communicating with one another through fabric network 110 using a fabric network protocol, such as NVMe-oF. In some embodiments, fabric nodes may be organized as system nodes and subsystem nodes, where subsystem nodes include addressable storage resources and system nodes include subsystem management resources. Fabric network 110 may support a data connection to each subsystem fabric node, but typically conveys commands in addition to data, and optionally conveys metadata, error correction information and/or other information in addition to data values to be stored in storage devices 140 and data values read from storage devices 140.

In some embodiments, each storage device 140 includes a device controller, which includes one or more processing units (also sometimes called CPUs or processors or microprocessors or microcontrollers) configured to execute instructions in one or more programs. In some embodiments, the one or more processors are shared by one or more components within, and in some cases, beyond the function of the device controllers. Media devices are coupled to the device controllers through connections that typically convey commands in addition to data, and optionally convey metadata, error correction information and/or other information in addition to data values to be stored in media devices and data values read from media devices. Media devices may include any number (i.e., one or more) of memory devices including, without limitation, non-volatile semiconductor memory devices, such as flash memory device(s).

In some embodiments, media devices in storage devices 140 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. Storage locations may include physical and/or logical locations on storage devices 140 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in the media flash translation layer (FTL) in other contexts. Media segments may include physical storage locations on storage devices 140, which may also correspond to one or more logical storage locations. In some embodiments, media segments may include a continuous series of physical storage location, such as adjacent data units on a storage medium, and, for flash memory devices, may correspond to one or more media erase or programming blocks. A logical data group may include a plurality of logical data units that may be grouped on a logical basis, regardless of storage location, such as data objects, files, or other logical data constructs composed of multiple host blocks.

Figure 2:
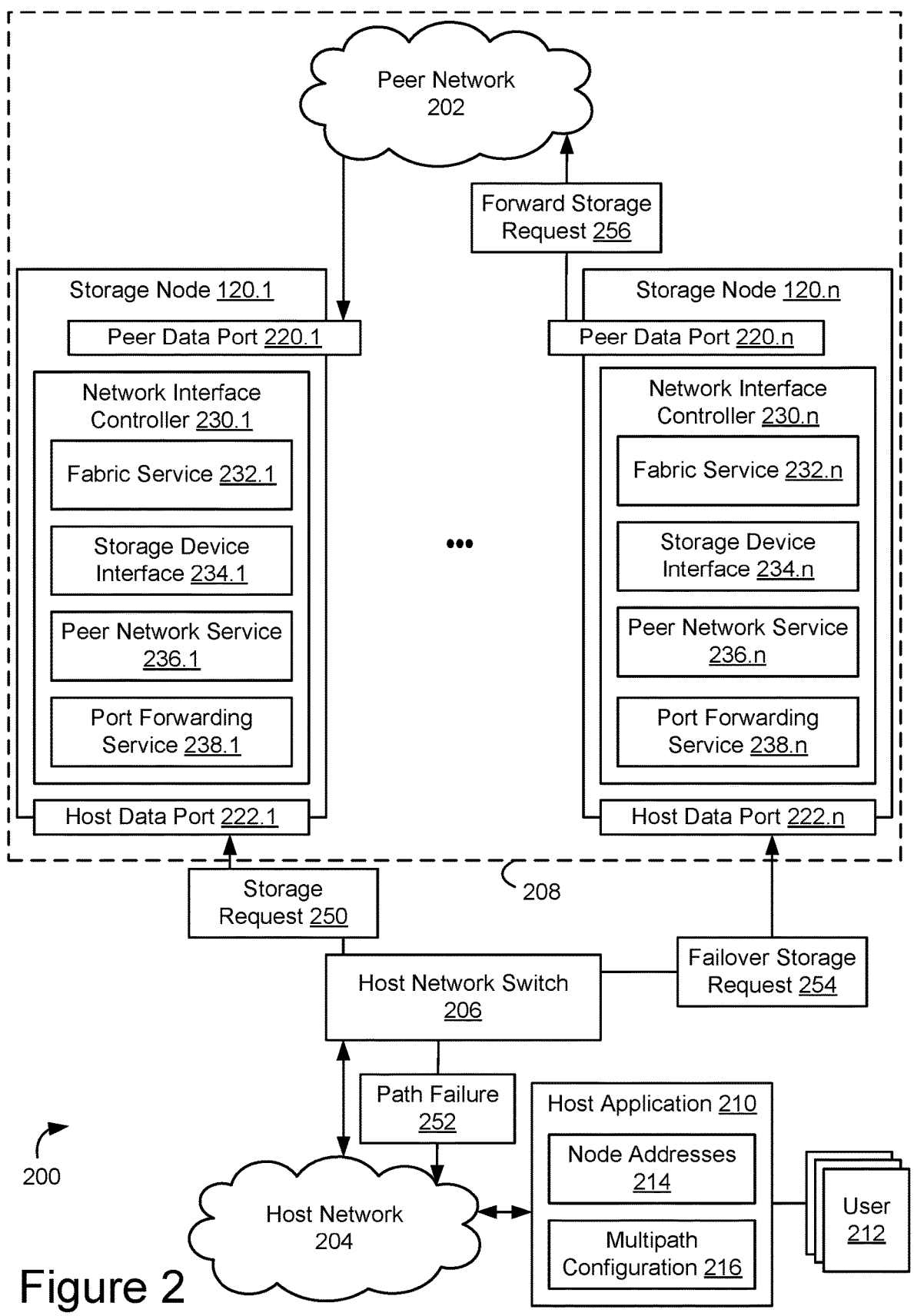
FIG. 2 schematically illustrates a fabric architecture that may be used by the storage system of FIG. 1 to provide a failover storage path.

FIG. 2 shows an embodiment of an example storage system 200, such as a set of storage blades in an enclosure with an ethernet backplane and network switch for connecting to a host network. Storage system 200 may be implemented as a plurality of storage nodes 120.1-120.n coupled to a host application 210 for accessing, storing, and using data stored in storage system 200. Storage nodes 120 may be located within an enclosure 208 that includes a peer network 202 configured for communication between the peer storage nodes within enclosure 208. For example, peer network 202 may include an ethernet backplane that connects to each storage node 120 through a peer data port 220.1. Storage nodes 120 may each include a host data port 222 that may be connected to host network 204. For example, each host data port 222.1 may be connected via ethernet cable to corresponding data ports in a host network switch 206 configured for communication with host network 204 and host application 210.

The connection between storage system 200 and host application 210 could, for example, be implemented as a suitable data communication network 202, such as a LAN, WAN, internet, etc. Application 210 could, for example, be a dedicated software application running on a computing device, such as a server, a personal computer, a laptop, a wireless telephone, a personal digital assistant or any other type of communication device that is able to interface with the storage system 200. For example, host application 210 may be a software or firmware application running on a host computing system, such as host system 112 in FIG. 1. In some embodiments, application 210 could, for example, comprise a suitable file system which enables a general-purpose software application to interface with storage system 200, an application programming interface (API) library for the storage system 200, etc. In some embodiments, application 210 may be a user application, such as business or personal application instantiated in a local, client/server, web, and/or mobile application that enables users 212 to interact with data stored in storage system 200.

In some embodiments, host application 210 may be configured to identify storage volumes configured in storage system 200. For example, host application 210 may be hosted on a computing system configured as a fabric node that may access and/or store fabric node addresses 214 for one or more fabric nodes in storage system 200. For example, storage nodes 120 may be configured as fabric nodes running fabric services 232 on network interface controllers 230. In some embodiments, host application 210 may have previously identified one or more fabric nodes and corresponding subsystem addresses and/or been configured manually with a fabric subsystem address for fabric services 232. In some embodiments, host application 210 and/or storage nodes 120 may include a discovery controller configured to store fabric node configuration information, such as a discovery log, and host application 210 may use a discovery request to receive an updated discovery log with fabric node addresses, such as controller identifiers, subsystem identifiers, port identifiers, and other information.

In some embodiments, host application 210 may be configured with a multipath configuration 216 that enables multiple input/output (I/O) storage paths to be used for reaching the storage devices of any given storage node 120. For example, host application 210 may initially discover or be manually configured with port identifiers, such as internet protocol (IP) addresses or other network addresses, for host data ports 222 of one or more storage nodes. The IP addresses of host data ports 222 may be configured as a primary storage path for reaching fabric services 232 and stored in one or more configuration tables, such as a kernel IP routing table. Multipath configuration 216 may include one or more failover storage paths for each storage node 120. For example, should host data port 222.1 fail for reaching storage node 120.1, multipath configuration 216 may include one or more additional paths for reaching storage node 120.1. In some embodiments, each other or different storage node 120 in storage system 200 may be configured to provide a failover storage path for host application 210. For example, storage nodes 120 may be enabled with port forwarding that allows them to pass data, such as IP packets, from host data port 222 to peer data port 220 and through peer network 202 to another peer data port 220. In some embodiments, a failover storage path may be configured by selecting the host data port 222 of a different storage node 120 as an IP gateway and the peer data port 220 of the target storage node as the destination IP address. For example, multipath configuration 216 may include modification of one or more configuration tables, such as the kernel IP routing table, to include one or more failover data paths by including additional routing table entries with corresponding destination identifiers, gateway identifiers, and other configuration values.

In some embodiments, storage nodes 120 may use a low-power processor and may be equipped with ten or twelve storage devices, such as high-capacity serial advanced technology attachment (SATA), small computer system interface (SCSI), serial attached SCSI (SAS), fibre channel (FC), peripheral component interface express (PCIe), non-volatile memory express (NVMe), etc., data storage devices. In some embodiments, storage nodes 120 may include a compute complex providing storage controller or other storage-related functionality. In some embodiments, storage nodes 120 may each include a network interface controller 230 comprising processor, memory, and other hardware resources (not shown, see FIG. 3) for running one or more software or firmware services. For example, network interface controller 230 may include fabric service 232, storage device interface 234, peer network service 236, and port forwarding service 238. These services may be executed by network interface controller 230 to enable communication with one or more other components of storage system 200, such as host application 210 and peer storage nodes 120. In some embodiments, data may be transferred between components by means of a variety of network protocols, including transmission control protocol (TCP), remote direct memory access (RDMA), RDMA over converged Ethernet (RoCE), NVMe over fabric (NVMe-oF), hypertext transfer protocol (HTTP)/representational state transfer (REST) object interfaces, language-specific interfaces such as Microsoft .Net, Python, C, etc.

In some embodiments, fabric service 232 may include communication protocols for configuring network interface controller 230.1 as a controller or system node supporting a plurality of subsystem nodes for individual storage devices and/or corresponding volumes or namespaces. For example, fabric service 232 may provide routing of storage requests from host application 210 through storage device interface 234 to the plurality of storage devices within storage node 120. In some embodiments, storage device interface 234 may comprise a network and/or bus interface interconnecting the plurality of storage devices with network interface controller 230. For example, a plurality of NVMe SSDs may connect through PCIe interconnects and a corresponding bus structure to network interface controller 230.

In some embodiments, peer network service 236 may include communication protocols for enabling communication between peer storage nodes 120 and/or the storage devices they contain. For example, storage node 120.1 may use peer network service 236.1 and peer network 202 to communicate with storage node 120.n for storage management and/or data transfer functions between storage nodes 120 and/or their respective storage devices. In some embodiments, peer network service 236 may be configured to support a network protocol, such as TCP or converged ethernet (CE), and a storage interface protocol, such as RDMA, for peer-to-peer communication over peer network 202.

In some embodiments, port forwarding service 238 may be enabled to allow network traffic received through host data port 222 to be forwarded through peer data port 220. For example, storage node 120.1 may receive IP traffic addressed to host data port 222 as a gateway and forward that IP traffic through peer data port 220 to a destination network address corresponding to the IP address of the peer data port of a different storage node. In some embodiments, fabric service 232 and peer network service 236 may share a common network or transport protocol, such as TCP, and fabric service 232.1 may be configured to receive network traffic from both host network 204 and peer network 202, even though they are logically independent networks. In some embodiments, port forwarding service 238 may operate at the network/transport level to forward packets between the two networks without regard to the contents of the packets and may bypass fabric service 232 unless the destination network address of the packet corresponds to the IP address identifying one of that storage nodes ports.

As an operating example, host application 210 may generate a storage request 250 and direct it through host network 204 with a destination address corresponding to the port identifier IP address for host data port 222.1. Host network 204 may direct IP packets corresponding to the storage request through host network switch 206 and attempt to deliver them to storage node 120.1 through host data port 222.1. In this example, host data port 222.1 and/or some other component along the primary data path has failed and host application 210 determines that a path failure has occurred. For example, an error message indicating path failure 252 may be returned from host network 204 and/or host network switch 206 and/or a sending component in host application 210 may timeout or otherwise generate a request failure status.

Responsive to the storage request failure indicating that the primary storage path is not available, host application 210 may use multipath configuration 216 to select a failover data path. Multipath configuration 216 may include an IP routing table that includes a prioritized list of data paths corresponding to storage node 120.1 and/or fabric service 232.1. For example, each failover storage path may include a failover port identifier, such as the IP address of peer data port 220.1, to be used as the destination address and a failover gateway identifier, such as the IP address of host data port 222.n. Multipath configuration 216 may select the next storage path in the priority list and host application 210 may send failover storage request 254 to the failover gateway identifier through host network 204 and host network switch 206.

Storage node 120.n may receive failover storage request 254 through host data port 222.n. Port forwarding service 238.n may determine that the destination address is not host data port 222.n or peer data port 220.n and forward the IP packets corresponding to failover storage request 254 through peer data port 220.n. Based on the destination address corresponding to the IP address of peer data port 220.1, forward storage request 256 may be routed through peer network 202 to peer data port 220.1. Forward storage request 256 may be received by network interface controller 230.1 through peer data port 220.1 and fabric service 232.1 may direct it to the appropriate storage device through storage device interface 234.1. Storage node 120.1 may receive the host I/O contained in storage request 250 through the failover data path, despite the failure of host data port 222.1.

Figure 3:
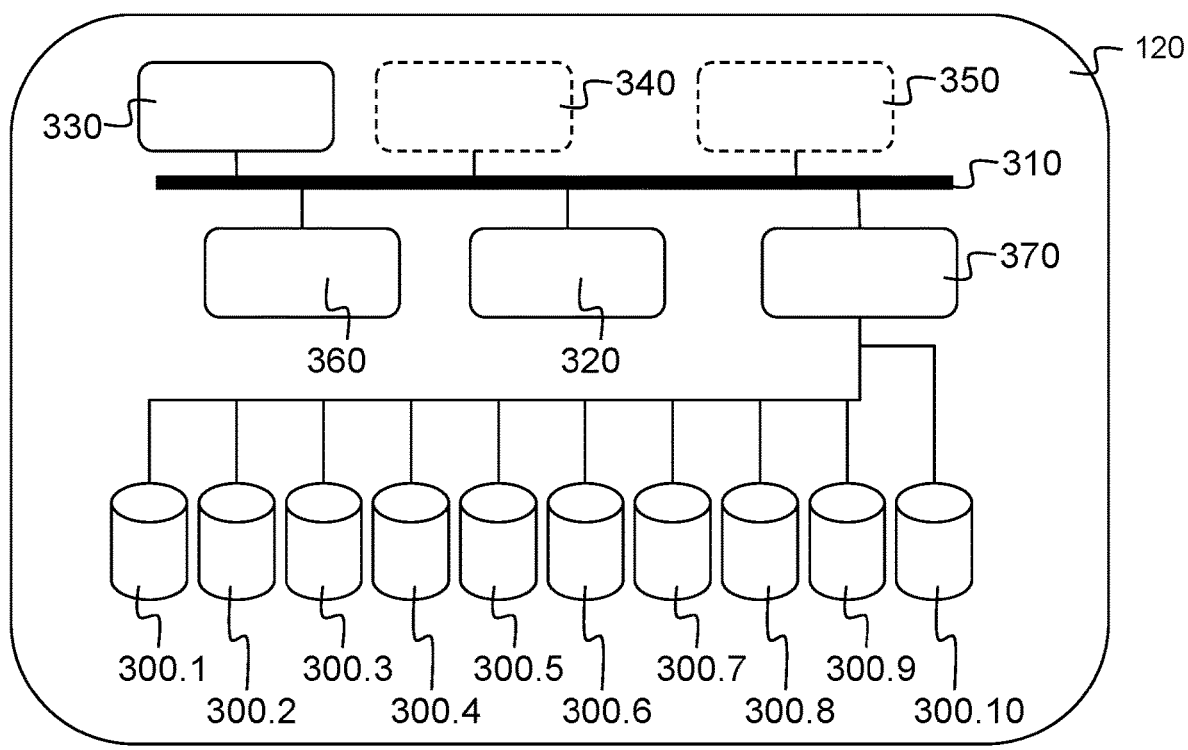
FIG. 3 schematically illustrates a storage node of the distributed storage system of FIG. 1.

FIG. 3 shows a schematic representation of one of the storage nodes 120. Storage node 120 may comprise a bus 310, a storage node processor 320, a storage node memory 330, one or more optional input units 340, one or more optional output units 350, a communication interface 360, a storage element interface 370 and a plurality of storage elements 300.1-300.10. In some embodiments, at least portions of bus 310, processor 320, local memory 330, communication interface 360, storage element interface 370 may comprise a storage controller or backplane management controller, such as storage controllers 130. Bus 310 may include one or more conductors that permit communication among the components of storage node 120. Processor 320 may include any type of conventional processor or microprocessor that interprets and executes instructions. Local memory 330 may include a random-access memory (RAM) or another type of dynamic storage device that stores information and instructions for execution by processor 320 and/or a read only memory (ROM) or another type of static storage device that stores static information and instructions for use by processor 320. Input unit 340 may include one or more conventional mechanisms that permit an operator to input information to said storage node 120, such as a keyboard, a mouse, a pen, voice recognition and/or biometric mechanisms, etc. Output unit 350 may include one or more conventional mechanisms that output information to the operator, such as a display, a printer, a speaker, etc. Communication interface 360 may include any transceiver-like mechanism that enables storage node 120 to communicate with other devices and/or systems, for example mechanisms for communicating with other storage nodes 120 or controller nodes 106 such as for example two 1 gigabit (Gb) Ethernet interfaces. Storage element interface 370 may comprise a storage interface, such as a Serial Advanced Technology Attachment (SATA) interface, a Small Computer System Interface (SCSI), peripheral computer interface express (PCIe), etc., for connecting bus 310 to one or more storage elements 300, such as one or more storage devices 140, for example, 2 terabyte (TB) SATA-II disk drives or 2 TB NVMe solid state drives (SSDs), and control the reading and writing of data to/from these storage elements 300. As shown in FIG. 3, such a storage node 120 could comprise ten 2 TB SATA-II disk drives as storage elements 300.1-300.10 and in this way storage node 120 would provide a storage capacity of 20 TB to the storage system 100.

Taking into account FIG. 1 and FIG. 3, the storage system 100 may comprises a plurality of storage elements 300. The storage nodes 120 each comprise a share of these storage elements 300. Each storage nodes 120 could comprise a similar amount of storage elements, but this is, however, not essential. Storage node 120 could for example comprise four, eight, ten, or any other number of storage elements appropriate to interface and form factor constraints. The storage system 100 may be operable to store and retrieve a data objects, data blocks, data files, or other data units comprising data, for example, 64 megabytes (MB) of binary data and a location or object identifier for addressing this data unit, for example a universally unique identifier such as a globally unique identifier (GUID).

Storage elements 300 may be configured as redundant or operate independently of one another. In some configurations, if one particular storage element 300 fails its function can easily be taken on by another storage element 300 in the storage system. Furthermore, the independent operation of the storage elements 300 allows to use any suitable mix of types storage elements 300 to be used in a particular storage system 100. It is possible to use for example storage elements with differing storage capacity, storage elements of differing manufacturers, using different hardware technology such as for example conventional hard disks and solid-state storage elements, using different storage interfaces such as for example different revisions of SATA, SAS, FC, NVMe, and so on. All this results in specific advantages for scalability and flexibility of storage system 100 as it allows to add or remove storage elements 300 without imposing specific requirements to their design in correlation to other storage elements 300 already in use in that storage system 100.

Figure 4:
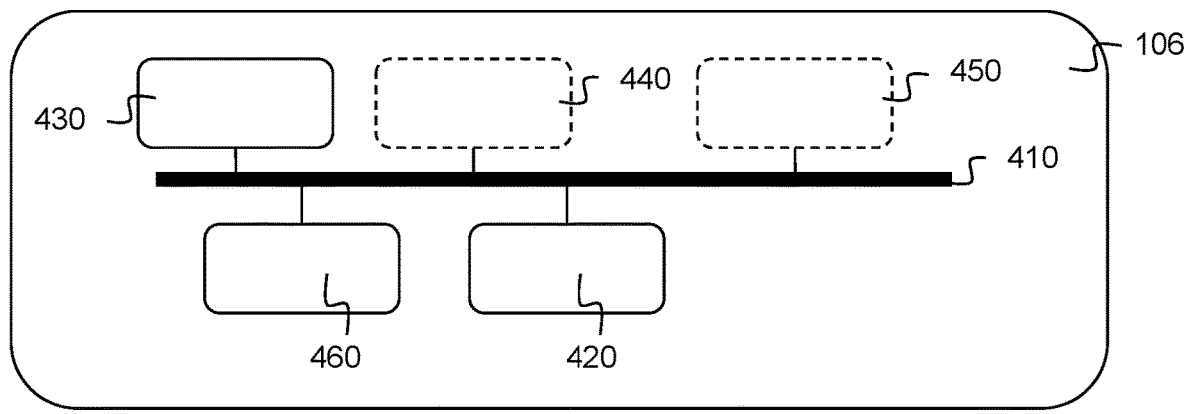
FIG. 4 schematically illustrates a host or controller node of the distributed storage system of FIG. 1.

FIG. 4 shows a schematic representation of the controller nodes 106 and/or host systems 112. Controller node 106 may comprise a bus 410, a controller processor 420, a controller memory 430, one or more optional input units 440, one or more optional output units 450, and a communication interface 460. Bus 410 may include one or more conductors that permit communication among the components of controller node 106. Processor 420 may include any type of conventional processor or microprocessor that interprets and executes instructions. Local memory 430 may include a random access memory (RAM) or another type of dynamic storage device that stores information and instructions for execution by processor 420 and/or a read only memory (ROM) or another type of static storage device that stores static information and instructions for use by processor 420 and/or any suitable storage element such as a hard disc or a solid state storage element. An optional input unit 440 may include one or more conventional mechanisms that permit an operator to input information to said controller node 106 such as a keyboard, a mouse, a pen, voice recognition and/or biometric mechanisms, etc. Optional output unit 450 may include one or more conventional mechanisms that output information to the operator, such as a display, a printer, a speaker, etc. Communication interface 460 may include any transceiver-like mechanism that enables controller node 106 to communicate with other devices and/or systems, for example mechanisms for communicating with storage nodes 120 and/or controller nodes 106, such as 10 Gb Ethernet interfaces.

Controller node 106 could have an identical design as a storage node 120, or one of the storage nodes 120 of the storage system could perform both the function of a controller node 106 and a storage node 120. Further, the device on which management system 102 or host systems 112 run may be configured similarly to the system components shown for controller node 106.

Figure 5:
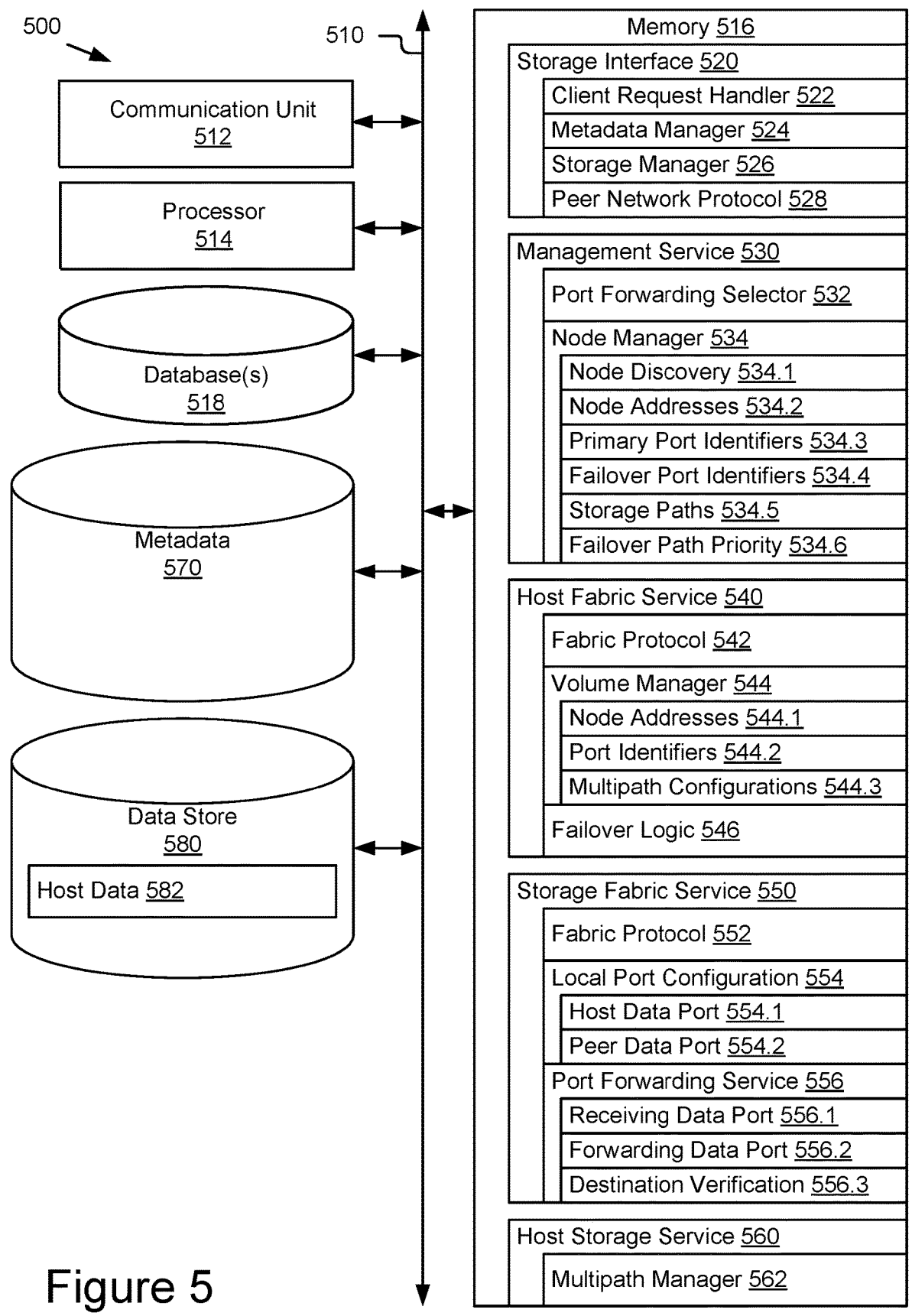
FIG. 5 schematically illustrates some elements of the nodes of FIG. 1-4 in more detail.

FIG. 5 schematically shows selected modules of a controller node, storage node, and/or host node configured in a fabric network with fabric node and storage management functions for distributed data storage and access. More specifically, the selected modules generally support port forwarding across storage nodes to enable failover data paths through a peer network. Storage system 500 may be configured as a node with an architecture and/or hardware similar to controller nodes 106 and/or storage nodes 120. Storage system 500 may incorporate elements and configurations similar to those shown in FIGS. 1-4. For example, storage system 500 may be configured in: storage node 120 to provide storage interface 520, metadata store 570, and/or data store 580 using its constituent data storage devices; management system 102 and/or host system 112 may host management service 530, and host system 112 may provide host storage service 560. Host fabric service 540 may run on host system 112 and storage fabric service 550 may run on storage controller 130 of storage node 120.

Storage system 500 and/or components thereof may include a bus 510 interconnecting at least one communication unit 512, at least one processor 514, and at least one memory 516. Bus 510 may include one or more conductors that permit communication within and/or among the components of storage system 500. Communication unit 512 may include any transceiver-like mechanism that enables storage system 500 to communicate with other devices and/or systems. For example, communication unit 512 may include wired or wireless mechanisms for communicating with host systems, management systems, and/or one or more storage systems or components, such as storage nodes or controller nodes. Processor 514 may include any type of processor or microprocessor that interprets and executes instructions. Memory 516 may include a random access memory (RAM) or another type of dynamic storage device that stores information and instructions for execution by processor 514 and/or a read only memory (ROM) or another type of static storage device that stores static information and instructions for use by processor 514 and/or any suitable storage element such as a data storage device.

Storage system 500 may include or have access to one or more databases and/or specialized data stores, such as metadata store 570 and/or host data store 580. Data stores may include one or more data structures for storing, retrieving, indexing, searching, filtering, etc. of structured and/or unstructured data elements. In some embodiments, metadata store 570 may be structured as reference data entries and/or data fields indexed by metadata key value entries related to data objects, data files, or other host data units stored in host data store 580. In some embodiments, data store 580 may include data objects comprised of object data (such as host data 582), some amount of metadata (stored as metadata tags), and a GUID. Metadata store 570, host data store 580, and/or other databases or data structures may be maintained and managed in separate computing systems, such as storage nodes, with separate communication, processor, memory, and other computing resources and accessed by storage system 500 through data access protocols. In some embodiments, metadata store 570 may be distributed across multiple systems, such as a plurality of access systems or controller nodes. Metadata store 570 and/or portions thereof may be sharded data stores, wherein the data stores are partitioned into segments stored in different computing systems.

Storage system 500 may include a plurality of modules or subsystems that are stored and/or instantiated in memory 516 for execution by processor 514. For example, memory 516 may include a storage interface 520 configured to receive, process, and respond to storage requests from client or host systems or other nodes in storage system 500. Memory 516 may include a management service 530 configured to configure and/or manage fabric communication among fabric nodes, particularly configuration of failover. Memory 516 may include a host fabric service 540 configured to manage configuration and execution of fabric communications at a host or initiator fabric node, including failover storage path functions. Memory 516 may include a storage fabric service 550 configured to manage configuration and execution of fabric communications at a storage node or controller fabric node, including access to storage subsystems and port forwarding. Memory 516 may include host storage service 560 configured to generate and manage storage requests to storage nodes and volumes, namespaces, and/or data storage devices therein through the fabric network.

Storage interface 520 may include an interface protocol or set of functions and parameters for storing, reading, and otherwise managing storage requests to an associated storage system and the corresponding metadata data source for mapping file data to persistent storage data elements. For example, storage interface 520 may include functions for reading, writing, modifying, or otherwise manipulating data objects or data blocks and their respective client or host data and metadata in accordance with the protocols of an object storage system or a block storage system. In some embodiments, storage interface 520 may enable direct memory access and/or access over NVMe protocols to host data units 582 stored in data store 580. In a fabric-based, disaggregated storage system, the functions of storage interface 520 may be distributed across nodes to provide flexibility and scalability of storage and storage management resources. Communication among these nodes, including communication with client or host nodes, may be conducted using fabric protocols enabled by fabric management service 530 and storage fabric service 550. In some embodiments, one or more functions of storage interface 520 may be managed at the host level. In some embodiments, storage interface 520 may include the functions for locating and accessing relevant portions of the sharded data base.

In some embodiments, storage interface 520 may include a plurality of hardware and/or software modules configured to use processor 514 and memory 516 to handle or manage defined operations of storage interface 520. For example, storage interface 520 may include a client request handler 522, a metadata manager 524, a storage manager 526, and a peer network protocol 528. For any given storage request, storage interface 520 may receive a storage request through client request handler 522 and determine one or more operations based on the content of the request. These operations may include metadata operations handled by metadata manager 524 and/or host data operations handled by storage manager 526. The results of these operations may be processed, formatted, and returned by client request handler 522. In some embodiments, a plurality of storage nodes and/or data storage devices may coordinate processing of storage requests across storage nodes and/or data storage devices using a peer data channel, such as RDMA communication through an isolated peer network or backplane network, using peer network protocol 528.

Client request handler 522 may include an interface and/or communication event-based condition for receiving storage requests from one or more clients. For example, client or host systems may send an object, file, or block data request over a network connection and addressed to storage system 500 or a port or component thereof. Client request handler 522 may receive these requests and parse them according to the appropriate communication and storage protocols. For example, client request handler 522 may identify a transaction identifier, a client identifier, an object identifier (object name or GUID), a data operation, and additional parameters for the data operation, if any, from the received message or messages that make up the object data request. Client request handler 522 may also be configured for sending response messages, such as result, status, or error messages, to one or more clients or hosts related to storage requests received. For example, client request handler 522 may wait for processing by metadata manager 524 and/or storage manager 526 to complete or generate an error, and then provide an appropriate result or error message to the client system(s) for each storage request received.

Metadata manager 524 may include interfaces, functions, and/or parameters for creating, modifying, deleting, accessing, and/or otherwise managing host file metadata, such as object metadata, logical block address (LBA) maps, and/or transaction logs. For example, when a new object, file, or block is written to host data store 580, at least one new metadata entry may be created in metadata store 570 to represent parameters describing or related to the newly created object, file, or block. Metadata manager 524 may generate and maintain one or more data indexes that enable metadata manager 524 to locate metadata within metadata store 570. In some embodiments, metadata manager 524 may also manage file, block, or object metadata stored in host data store 580 with host data units 582. Metadata manager 524 may work in conjunction with storage manager 526 to create, modify, delete, access or otherwise manage metadata stored as tags or headers within data store 580.

Storage manager 526 may include interfaces, functions, and/or parameters for reading, writing, and deleting host data units 582 in data store 580. For example, PUT or write commands may be configured to write host data units to data store 580. GET or read commands may be configured to read data from data store 580. DELETE commands may be configured to delete data from data store 580, or at least mark a data object for deletion until a future garbage collection or similar operation actually deletes the data or reallocates the physical storage location to another purpose.

Other storage commands may be handled by storage manager 526. Storage commands processed by storage manager 526 may include parameters for accessing special functions and/or metadata resources stored with host or client data. Storage manager 526 may work in conjunction with metadata manager 524 for managing metadata, including versioning information. In erasure encoded systems, storage manager 526 may operate in conjunction with encoders, block spreaders, block clusterers, and decoders for encoding and decoding data objects in redundant and distributed data blocks in accordance with an erasure coding configuration or other data redundancy method. For example, storage manager 526 may use an encoder and block spreader to write data to data store 580 and use a block clusterer and decoder to read data from data store 580.

Peer network protocol 528 may include interfaces, functions, and/or parameters for supporting communication through a peer communication channel in accordance with one or more network and storage interface protocols. For example, peer network protocol 528 may include network and/or transport protocols, such as TCP or CE, for communicating among storage nodes and/or storage devices over an ethernet-based peer network. In some embodiments, peer network protocol 528 may support RDMA access among storage nodes and/or storage devices for command and/or data buffer access, communication, and/or data transfer. For example, peer network protocol 528 may include RoCE, RDMA over TCP (RoTCP), and/or other storage interface protocols for direct memory access over network protocols. In some embodiments, peer network protocol 528 may support storage interface protocols over bus connections, such as RDMA over PCIe among NVMe data storage devices, for communication among data storage devices within a storage node. In some embodiments, peer network protocol 528 may be configured for managing communication through a peer network that is logically independent from a host network. For example, the peer network may use a distinct subnet with IP addresses that are not discoverable on the host network and include resources or components that cannot see or access the host network.

Management service 530 may include an interface protocol and set of functions and parameters for receiving, defining, and otherwise managing network communication and related fabric node configurations for storage system 500 and/or a broader distributed storage system. For example, management service 530 may include functions for configuring fabric nodes and fabric subsystem nodes for defined controller and subsystem addresses, storage volumes, and host mappings. In some embodiments, management service 530 may also manage configuration of failover storage paths for reaching storage volumes in one or more storage nodes when a primary storage path fails. For example, management service 530 may access configuration parameters in host fabric service 540 and/or storage fabric service 550 for configuring the failover data paths. In some embodiments, management service 530 may be embodied in a remote management application that may selectively access configuration parameters in each instance of host fabric service 540 and/or storage fabric service 550 for configuring the relevant parameters on an automated or manual basis. In some embodiments, one or more fabric nodes, such as storage nodes 120 and/or host node/system 112, may include one or more functions of management service 530, such as the configuration of parameters for that node. In some embodiments, management service 530 may be embodied in management service 102.1 on management system 102. In some embodiments, each instance of management service 530 may be associated with a plurality of other fabric nodes running host fabric service 540 and/or storage fabric service 550. For example, management service 530 may be hosted on a controller, such as a backplane management controller for a particular rack, enclosure, or storage appliance, and the associated fabric nodes may be network interface controllers, such as the network interface controllers in the storage blade units installed in that rack or enclosure, each hosting an instance of storage fabric service 550.

In some embodiments, management service 530 may include a plurality of hardware and/or software modules configured to use processor 514 and memory 516 to handle or manage defined operations of management service 530. For example, management service 530 may include a port forwarding selector 532 and a node manager 534. Port forwarding selector 532 may be configured to enable or disable port forwarding across a plurality of network ports in one or more storage nodes. Node manager 534 may be configured to aggregate node addressing and configuration information across a plurality of fabric nodes in a fabric network and/or enable configuration of primary and failover data paths for communication among those fabric nodes.

Port forwarding selector 532 may include data structures, functions, and interfaces for enabling port forwarding service 556 in one or more storage nodes. For example, port forwarding selector 532 may send a configuration command and/or otherwise modify one or more configuration parameters to enable port forwarding across two or more network data ports in a storage node. In some embodiments, each storage node may include a host data port configured for a host network and a peer data port configured for a peer network. Both data ports and their network interface controller may use the same network and/or transport protocol, such as TCP, for their respective networks. In some embodiments, port forwarding selector 532 may enable port forwarding as part of the network and/or transport configuration parameters to direct packets based on IP address information without reference to the contents of those packets. For example, the network interface controller in each storage node may include a configuration parameter and/or configuration table for enabling or disabling port forwarding among two or more data ports. In some embodiments, port forwarding may be enabled across more than two data ports. In some embodiments, port forwarding selector 532 may include automated logic for accessing the port forwarding configuration parameters of each storage node as it is added to the fabric network and/or during a system initialization or configuration event and setting the port forwarding configuration parameters to an enabled state for forwarding network date between a host data port and a peer data port.

Node manager 534 may include data structures, functions, and interfaces for receiving, storing, and modifying fabric node address and configuration information. For example, node manager 534 may be configured for node discovery 534.1 and/or manual configuration of fabric node addresses 534.2 and related configuration information. In some embodiments, node discovery 534.1 may include the management of discovery logs containing fabric node addresses 534.2 and configuration information for a set of fabric resources mapped to one or more host or initiator nodes. For example, storage and/or controller nodes may be identified in corresponding data structures, such as lists or tables, in management service node manager 534 for use in identifying destination fabric nodes, controller and/or subsystem identifiers, port identifiers, and other configuration information for defining storage paths to volumes, namespaces, or other logical data structures in the corresponding data storage devices. In some embodiments, fabric node addresses 534.2 and related configuration information, such as for one or more storage nodes in a set of peer storage nodes corresponding to one or more data volumes mapped to a host or initiator node, may be used to configure corresponding storage path information in a volume manager 544 of the corresponding host fabric service 540. In some embodiments, the fabric or subsystem node information managed by node manager 534 may include subsystem types, transport requirements, port identifiers (primary and/or failover port identifiers), controller identifiers, maximum queue size, transport service identifiers, subsystem names, subsystem addresses, and subsystem address types. The fabric nodes targeted by node manager 534 may be identified and maintained regardless of whether the storage system uses static or dynamic internet protocol (IP) configurations.

In some embodiments, node manager 534 may be configured to manage storage path configuration information for each host or initiator node. For example, node manager 534 may aggregate port identifiers, such as static or dynamic IP addresses, assigned to the network data ports of each storage node. In some embodiments, node manager 534 may determine the primary port identifiers 534.3 for each storage node. For example, each storage node may include at least one host data port and node manager 534 may associate the IP address of the at least one host data port with the fabric node identifier or name for the corresponding storage fabric service 550. In some embodiments, node manager 534 may determine failover port identifiers 534.4 for each storage node. For example, each storage node may include at least on peer data port and node manager 534 may associate the IP address of the at least one peer data port with the fabric node identifier or name for the corresponding storage fabric service 550. In some embodiments, node manager 534 may be configured to determine a plurality of possible storage paths for each storage node. For example, node manager 534 may determine a primary storage path based on the primary port identifier 534.3 for a target storage node and one or more failover storage paths based on the combination of failover port identifier 534.4 (as a destination port address) and one or more primary port identifiers 534.3 for different storage nodes (as a gateway port address). In some embodiments, node manager 534 may also include logic or an interface for configuring failover path priority 534.6 among a plurality of failover storage paths. For example, node manager 534 may be used to assign priority values to primary and failover storage paths 534.5 for reaching a target storage node and/or order storage paths 534.5 for each target storage node in a priority ordered list or table. In some embodiments, node manager 534 may provide and/or configure a prioritized list of storage paths in volume manager 544 of each host fabric service 540 to support the relevant subset of storage nodes used by that host node or system.

Host fabric service 540 may include an interface protocol and set of functions and parameters for receiving, sending, and otherwise managing network communication for a particular fabric node, such as a host or initiator node. For example, each host node may be configured to run host fabric service 540 to provide fabric-based communication and access to resources on that node. In some embodiments, host fabric service 540 may include configuration functions for creating and modifying host storage volumes on fabric nodes that include host storage resources, such as storage nodes, and defining primary and failover storage paths for reaching those storage resources.

In some embodiments, host fabric service 540 may include a plurality of hardware and/or software modules configured to use processor 514 and memory 516 to handle or manage defined operations of host fabric service 540. For example, host fabric service 540 may include a fabric protocol 542, a volume manager 544, and failover logic 546. For example, fabric protocol 542 may be configured to provide the interface definitions, addressing, and messaging formats for fabric communication with other fabric nodes. Volume manager 544 may be configured to process mapping requests to define storage volumes with fabric addresses and host mapping information. Failover logic 546 may be configured to determine a failure condition of one or more storage paths and select a failover storage path for one or more failover storage request attempts.

Fabric protocol 542 may include data structures, functions, and interfaces for communicating with other fabric nodes. For example, fabric protocol 542 may include the interface definitions, addressing, and message handling to send and receive fabric communications over a fabric network, such as a host network. In some embodiments, fabric protocol 542 may be configured as a network fabric protocol for a fabric communication and memory access standard, such as NVMe-oF. For example, each storage node may run interface logic defined by the NVMe-oF standard for accessing RDMA data buffers in the storage nodes and/or storage devices they contain for storing and accessing host data based on host data requests. In some embodiments, other fabric protocols that support host mapping, fabric node addressing, and/or multipath configuration may be used.

Volume manager 544 may include data structures, functions, and interfaces for managing storage volumes for the storage node mapped to a particular host node. For example, volume manager 544 may generate host mapping requests and/or host mapping parameters and update one or more data structures for configuring storage volumes in the storage nodes. In some embodiments, volume manager 544 may include one or more fabric addresses 544.1 for storage resources accessible through host fabric service 540 and storage fabric service 550. For example, volume manager 544 may include a qualified subsystem name and at least one port identifier 544.2 for each subsystem hosting a storage volume or other namespace. In some embodiments, volume manager 544 may include mapping information that associates each storage volume with one or more host systems configured to access those storage volumes. In some embodiments, volume manager 544 may be configured to maintain the system parameter data necessary to enable selective access to defined storage volumes by selected host systems. The interface protocols for accessing the storage resources defined for a storage volume from the host systems may include additional layers of verification and security beyond the node addresses 544.1 and associated port identifiers 544.2.

In some embodiments, volume manager 544 may support multipath configurations 544.3 for one or more storage nodes and/or associated storage volumes. For example, volume manager 544 may include a plurality of prioritized storage paths, such as a primary storage path and one or more failover storage paths. In some embodiments, multipath configurations 544.3 may be supported by one or more configuration parameters, such as a set of storage path definitions in a routing table, such as a kernel IP routing table. For example, management service 530 may be used to configure a prioritized set of storage path definitions in multipath configurations 544.3, including primary port identifiers, failover port identifiers, and one or more failover gateway identifiers.

Failover logic 546 may include data structures, functions, and interfaces for allowing hosts to determine a failure condition of a first storage path and select a failover storage path. For example, failover logic 546 may monitor for the failure of a storage request sent through a primary storage path and, responsive to detecting a storage request failure, select a failover storage path for a failover storage request. In some embodiments, failover logic 546 may be configured to monitor network and/or transport information to determine when packets sent via a selected storage path fail to reach their destination. For example, failover logic 546 may receive an undeliverable or error status related to a destination address, such as the IP address of a target data port, and determine from the status or message that a storage path through the target data port is not available. In some embodiments, the storage request failure condition may trigger failover logic 546 to select a failover storage path for one or more failover storage request attempts. For example, failover logic 546 may use multipath configuration 544.3 to make failover storage request attempts to a prioritized list of failover storage paths.

In some embodiments, failover logic 546 may be configured to determine whether each failover storage request attempt is successful or meets another failure condition. For example, failover logic 546 may similarly monitor the status of each failover storage request and proceed to another available failover storage path for each failure condition. In some embodiments, failover logic 546 may include additional logic for determining a failure source during one or more failover attempts. For example, failover logic 546 may determine a host data port failure from the primary storage path storage request. For each failover attempt, failover logic 546 may determine whether a failure condition related to the peer data port failure and/or storage node failure or the failure happened at the gateway data port, such as the host data port of another storage node. If the failure condition suggests failure of the storage node or all available ports to the storage node, a final storage request failure condition may be returned. If the failure condition suggests failure of a gateway storage node and other gateway storage nodes are available in multipath configuration 544.3, additional failover storage requests may be attempted using the additional failover storage paths through different storage nodes as gateways. In some embodiments, failover logic 546 may also be configured to determine failure of other network components, such as host network components, peer network components, etc., and logically appropriate failover handling. For example, network failures may generate a final failure condition (for eliminating all failover storage paths) and/or a delay condition to allow for network recovery.

Storage fabric service 550 may include an interface protocol and set of functions and parameters for receiving, sending, and otherwise managing network communication for a particular fabric node, such as a storage or controller node. For example, each storage node may be configured to run storage fabric service 550 to provide fabric-based communication and access to resources on that node. In some embodiments, storage fabric service 550 may include configuration functions for configuring port identifiers and port forwarding services, in addition to supporting volume definition and subsystem management for host nodes mapped to one or more storage resources in the storage node. In some embodiments, storage fabric service 550 may be instantiated in a network interface controller in each storage node in storage system 500.

In some embodiments, storage fabric service 550 may include a plurality of hardware and/or software modules configured to use processor 514 and memory 516 to handle or manage defined operations of storage fabric service 550. For example, storage fabric service 550 may include a fabric protocol 552, a local port configuration 554, and port forwarding service 556. For example, fabric protocol 542 may be configured to provide the interface definitions, addressing, and messaging formats for fabric communication with other fabric nodes. Local port configuration 554 may be configured to determine, receive, and/or store port address information for the storage node data ports used for fabric communication. Port forwarding service 556 may be configured to forward network traffic between logically independent networks, such as a host network connected to a host data port and a peer network connected to a peer data port.

Fabric protocol 552 may include data structures, functions, and interfaces for communicating with other fabric nodes. For example, fabric protocol 552 may include the interface definitions, addressing, and message handling to send and receive fabric communications over a fabric network, such as a host network and/or a peer network. In some embodiments, fabric protocol 552 may be configured as a network fabric protocol for a fabric communication and memory access standard, such as NVMe-oF. For example, each storage node may run interface logic defined by the NVMe-oF standard for accessing RDMA data buffers in the storage nodes and/or storage devices they contain for storing and accessing host data based on host data requests. In some embodiments, other fabric protocols that support host mapping, fabric node addressing, and/or port forwarding may be used.

Local port configuration 554 may include data structures, functions, and interfaces for determining the data port addresses and other configuration information for two or more data ports in the storage node hosting storage fabric service 550. For example, local port configuration 554 may configure the storage node ports according to corresponding physical, transport, and network protocols and parameters. In some embodiments, local port configuration 554 may include an IP address assigned to each data port as a unique port identifier within storage system 500. For example, each host data port 554.1 may be assigned an IP address in accordance with the network and/or subnet configuration of the host network and each peer data port 554.2 may be assigned an IP address in accordance with the network and/or subnet configuration of the peer network. In some embodiments, host data port 554.1 may be configured for sending and receiving host communications, such as host storage requests directed to the storage node, and peer data port 554.2 may be configured for sending and receiving peer-to-peer communications among peer storage nodes, such as peer command and data requests related to storage node and storage device processing of host storage requests and/or storage management operations.

Port forwarding service 556 may include data structures, functions, and interfaces for forwarding network traffic from a gateway or receiving data port 556.1 to a sending or forwarding data port 556.2. For example, for failover storage requests directed from a host node where the forwarding storage node is acting as gateway to the peer network, host data port 554.1 may be the receiving data port 556.1 and peer data port 554.2 may be the forwarding data port 556.2. For storage responses from the target storage node where the forwarding storage node is acting as a gateway to the host network, peer data port 554.2 may be the receiving data port 556.1 and host data port 554.1 may be the forwarding data port 556.2. In some embodiments, port forwarding service 556 may be configured to determine whether storage requests and/or their constituent data packets are addressed to the storage node as a destination address or a gateway address using destination verification 556.3. For example, destination verification 556.3 may include logic for comparing the destination address of the storage request and/or data packets to local port configuration 554, such as the IP addresses of host data port 554.1 and/or peer data port 554.2. In some embodiments, port forwarding service 556 may be configured to operate at the network or transport level and route data packets without regard to the storage request contents.

Host storage service 560 may include an interface protocol and set of functions and parameters for receiving, sending, and otherwise managing storage requests to one or more storage nodes in storage system 500. For example, each host node may include at least one instance of host storage service 560 configured to process host application storage operations and/or storage access requests and generate corresponding storage requests to storage volumes, namespaces, or other host data stored in the storage nodes. In some embodiments, host storage service 560 may generate host storage commands corresponding to read, write, delete, and other storage operations to be executed against host data in the storage nodes. For example, a host system may generate a read storage request targeting a host data object, file, or blocks that is communicated to the storage nodes based on communication between host fabric service 540 and storage fabric service 550. In some embodiments, storage requests from host storage service 560 may be received by storage interface 520 in the target storage node and/or storage device.

In some embodiments, host storage service 560 may include a plurality of hardware and/or software modules configured to use processor 514 and memory 516 to handle or manage defined operations of host storage service 560. In some embodiments, host storage service 560 may include a multipath manager 562 configured to determine the storage paths available for storage requests from host storage service 560. For example, multipath manager 562 may interface with failover logic 546 in host fabric service 540 to determine whether a primary storage path or failover storage path are available for communicating a storage request to a target storage node. In some embodiments, multipath manager 562 may include logic to determine whether one or more failover storage requests should be attempted and/or to respond to final storage request failures. In some embodiments, multipath manager 562 may enable a user or another system application to configured failover logic 546 according to desired storage request failover attempts and related status and error conditions. In some embodiments, multipath manager 562 may request and receive a universally unique identifier (ULM) corresponding to the failover storage path and save it for future addressing. For example, the ULM may enable the host node to more reliably address data packets to through the failover storage path and the peer network. In some embodiments, multipath manager 562 may use port availability status determined by failover logic 546 or another source to determine whether any given storage request should be sent using the primary storage path or a particular failover storage path.

Memory 516 may include additional logic and other resources (not shown) for configuring and maintaining the fabric network and processing storage requests, such as modules for generating, queueing, and otherwise managing input/output data requests. Processing of a data request by storage interface 520 may include any number of intermediate steps that yield at least one data operation in storage system 500. Management service 530, host fabric service 540, and/or storage fabric service 550 may include any number of additional data structures, functions, and interfaces for configuring and maintaining the fabric network, including controller initialization, administrative commands, configuration parameters, and other fabric node features.

Figure 6:
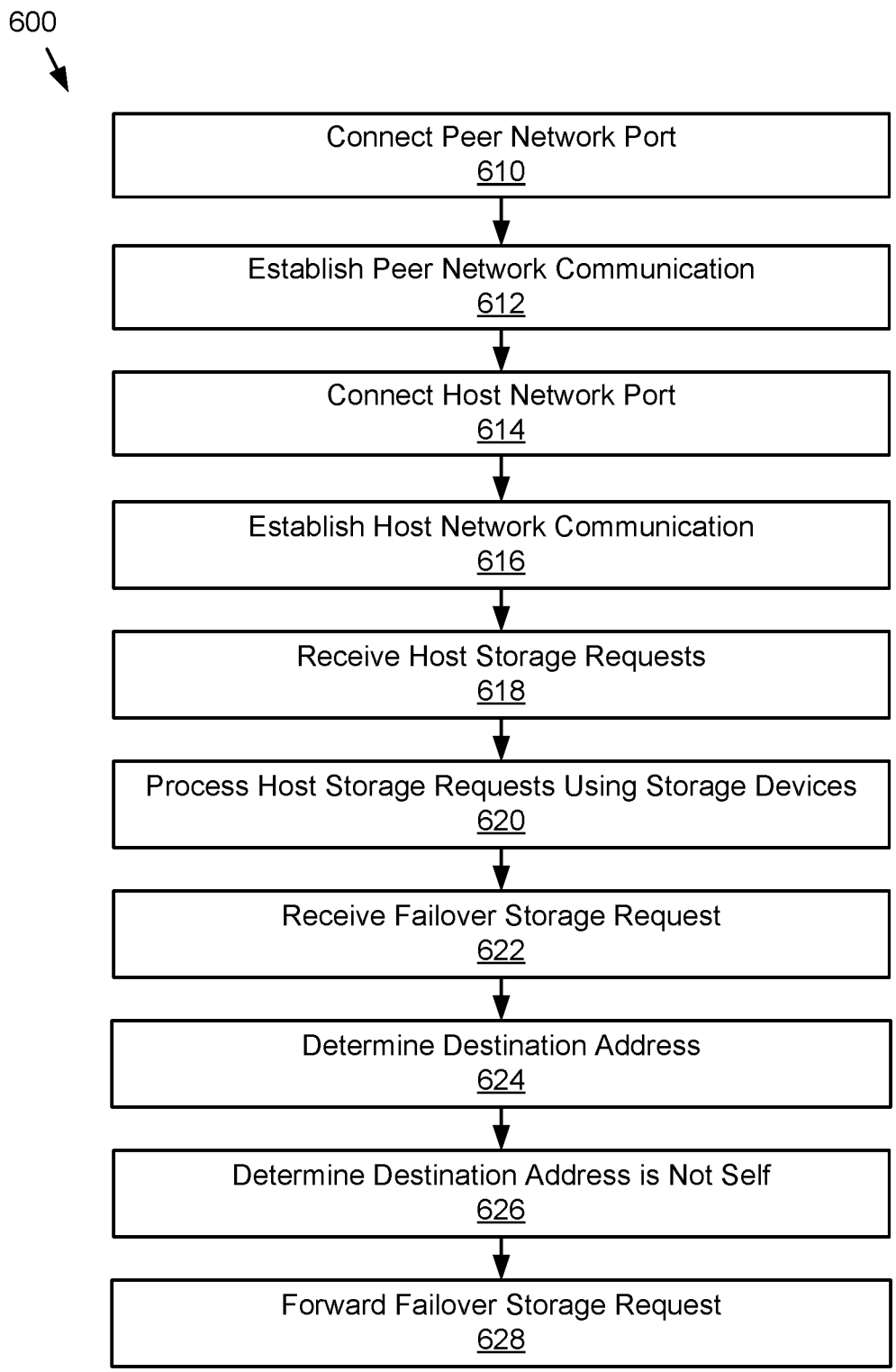
FIG. 6 is a flowchart of an example method of providing a failover storage path through a storage node.

As shown in FIG. 6, storage system 500 may be operated according to an example method for providing a failover storage path through a storage node, i.e. according to method 600 illustrated by blocks 610-628 in FIG. 6.

At block 610, a peer network port may be connected to a peer network for communication with at least one peer storage node. For example, a storage node may be placed in an enclosure and a backplane ethernet jack may be inserted into a peer data port in the storage node.

At block 612, peer network communication may be established. For example, a plurality of peer storage nodes may be connected via their respective peer data ports and initialized for communication using the peer interface protocol over a peer network subnet.

At block 614, a host network port may be connected to a host network for communication with one or more host nodes. For example, an ethernet jack from a host network switch may be inserted into a host data port in the storage node.

At block 616, host network communication may be established. For example, a plurality of peer storage nodes may be connected via their respective host data ports and initialized for communication using a host interface protocol over a host network.

At block 618, host storage requests may be received. For example, the storage node may receive host storage requests directed to the host data port as a destination address in accordance with a fabric protocol. In some embodiments, host storage requests may be received as failover storage requests through the peer data port, where a different storage node has acted as a gateway to forward the failover storage request through the peer network as described with regard to blocks 622-628 below.

At block 620, host storage requests may be processed using storage devices within the target storage node. For example, a storage interface may receive the storage request from the storage fabric service and process it as one or more storage operations.

At block 622, a failover storage request may be received. For example, the storage node may receive a failover storage request at the host data port as a gateway address, where the destination address is the peer data port of a different storage node.

At block 624, a destination address may be determined. For example, a port forwarding service may determine the destination address from the address information in the data packets corresponding to the failover storage request.

At block 626, the destination address may be determined to not be the storage node receiving the failover storage request. For example, the port forwarding service may compare the destination address to all of the data port addresses for the storage node, both host data port(s) and peer data port(s).

At block 628, the failover storage request may be forwarded to the target storage node. For example, the port forwarding service may send the data packets corresponding to the failover storage request through the peer data port and peer network to a destination address corresponding to the peer data port identifier of a different peer storage node.

Figure 7:
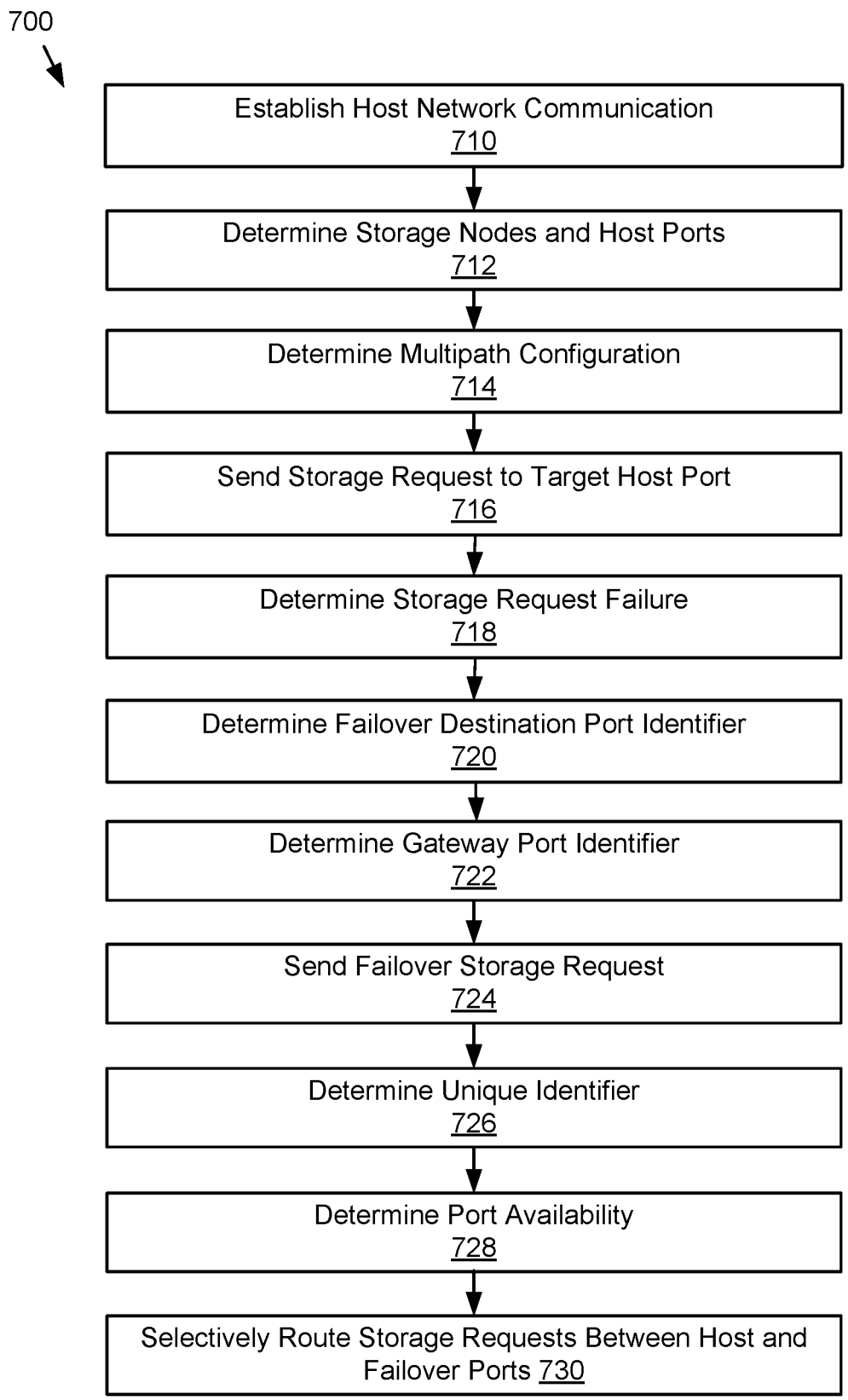
FIG. 7 is a flowchart of an example method of using a failover storage path through a different storage node from a host node.

As shown in FIG. 7, storage system 500 may be operated according to an example method for using a failover storage path through a different storage node from a host node, i.e. according to method 700 illustrated by blocks 710-730 in FIG. 7.

At block 710, host network communication may be established. For example, a host node may be configured to use fabric protocols to communicate with a plurality of storage nodes with volumes, namespaces, or host data mapped to the host node.

At block 712, storage nodes and host ports may be determined. For example, a host fabric service may discover a plurality of storage nodes including volumes, namespaces, or host data mapped to the host node, including corresponding fabric addressing information, such as the host data port identifier for fabric communication with a storage fabric service in each storage node.

At block 714, a multipath configuration may be determined. For example, a management service may be used to configure a multipath configuration with at least one failover storage path using another storage node as a gateway to reach the peer data port of the target storage node.

At block 716, a storage request may be sent to the host data port of the target storage node. For example, the host fabric service may direct a storage request from the host storage service to the IP address of the host data port of the target storage node as a destination address.

At block 718, a storage request failure may be determined. For example, the host fabric service may determine that the storage request was not successfully delivered to the target storage node, such as due to a host data port failure.

At block 720, a failover destination port identifier may be determined. For example, the multipath configuration may include a failover storage path entry that includes the IP address of the peer data port for the storage node.

At block 722, a gateway port identifier may be determined. For example, the multipath configuration may include the IP address for the host data port of a different storage node with access to the peer network to use as a gateway to the failover destination port.

At block 724, a failover storage request is sent to the target storage node through the gateway storage node. For example, the host fabric service may send the failover storage request to the gateway port identifier for the different storage node and a port forwarding service in that storage node may forward the failover storage request through the peer network to the target storage node.

At block 726, a unique identifier for the target storage node may be determined. For example, the target storage device may respond with a universally unique identifier (ULM) corresponding to the failover storage path and the storage fabric service of the target storage device. A multipath manager may store the ULM and associate it with the failover storage path of the target storage device.

At block 728, port availability may be determined. For example, the multipath manager may use the failover logic of the host fabric service to determine whether the host data port or the failover (peer) data port of the storage node is available for any given storage request.

At block 730, storage requests may be selectively routed between the host data port and the failover data port. For example, the multipath manage may determine whether to send storage requests using the primary data path or the failover data path based on port availability determined at block 728.

Figure 8:
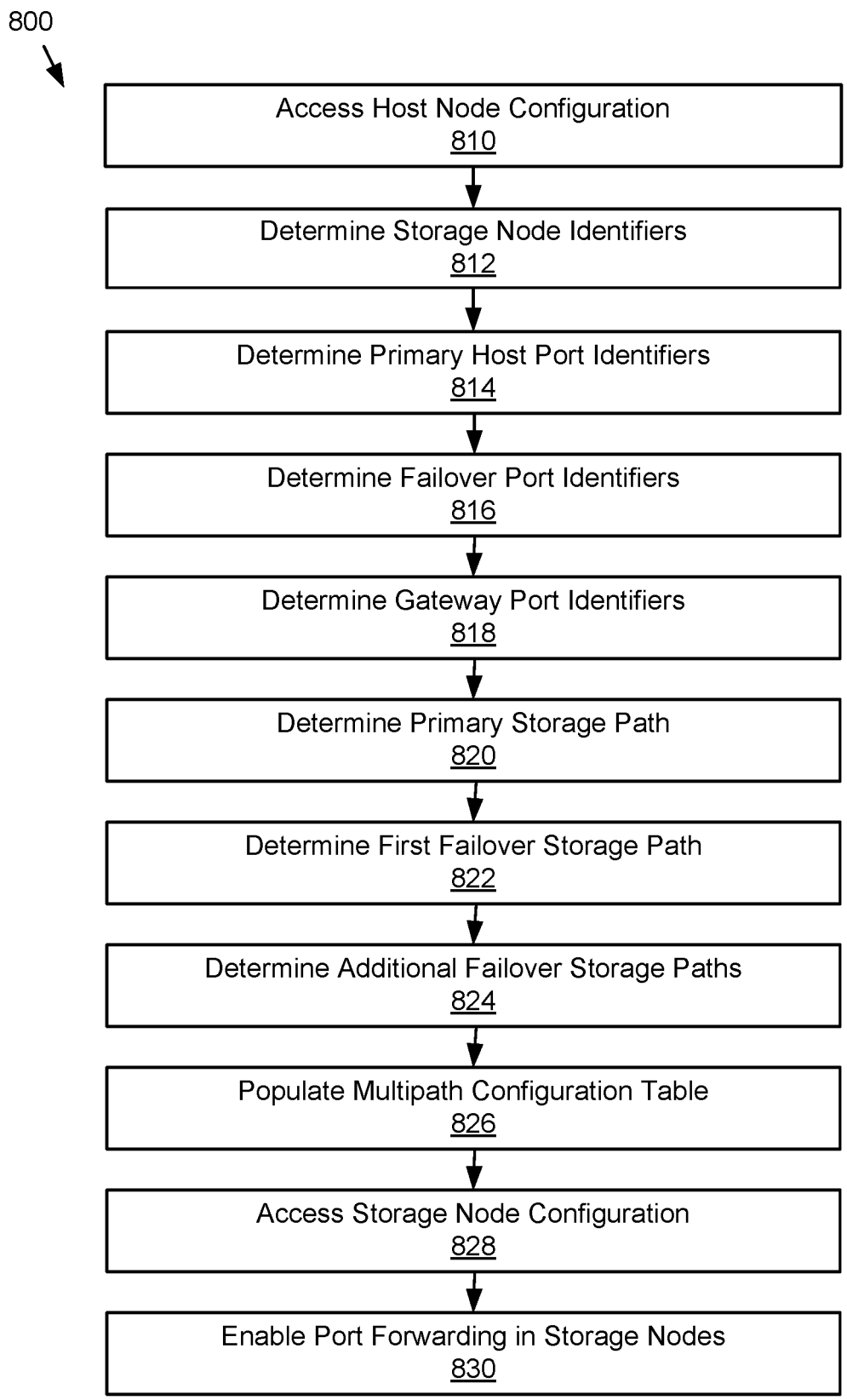
FIG. 8 is a flowchart of an example method of configuring a storage system to use failover storage paths through other storage nodes.

As shown in FIG. 8, storage system 500 may be operated according to an example method for configuring a storage system to use failover storage paths through other storage nodes, i.e. according to method 800 illustrated by blocks 810-830 in FIG. 8.

At block 810, a host node configuration may be accessed. For example, a management service may access one or more configuration parameters, such as a multipath configuration table, in a selected host node.

At block 812, storage node identifiers may be determined. For example, the management service and/or the host node may include configuration information for one or more storage nodes mapped to the host node, including a unique storage node or storage fabric service identifier.

At block 814, primary host port identifiers may be determined. For example, the management service and/or the host node may include the IP address of the host data port for reaching the storage node or storage fabric service from the host network.

At block 816, failover data port identifiers may be determined. For example, the management service and/or the host node may include or receive the IP address of a peer data port that may be used to access the storage node from the peer network as a failover destination address.

At block 818, gateway port identifiers may be determined. For example, the management service and/or the host node may determine one or more different storage nodes mapped to the host node that share the same peer network and use their host data ports as gateway ports for sending storage requests through the peer network.

At block 820, a primary storage path may be determined. For example, the management service and/or host node may determine the primary storage path to be through the host network to the host data port of the target storage node.

At block 822, a first failover storage path may be determined. For example, the management service and/or host node may determine a failover storage path based on the failover port identifier and selecting the gateway port identifier based on a different storage node.

At block 824, additional failover storage paths may be determined. For example, the management service and/or host node may determine any number of additional failover storage paths using the same failover port identifier and selecting the gateway port identifier from another storage device (other than the storage device selected at block 822).

At block 826, a multipath configuration table may be populated. For example, the management service and/or host node may determine a priority order for the failover storage paths and place an ordered series of entries for sequential failover data paths, starting from the primary storage path, in a multipath configuration table, such as a kernel IP routing table.

At block 828, a storage node configuration may be accessed. For example, the management service may access one or more configuration parameters, such as a port forwarding parameter, in a selected storage node to be configured as a gateway.

At block 830, port forwarding may be enabled in the storage nodes. For example, the management service may enable a port forwarding service in each storage node that may act as a gateway for failover data traffic from another storage node.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A system, comprising:
a first storage node comprising:
a first data port configured for connection to a peer network;
a second data port configured for connection to a host network, wherein the peer network is configured as a physically independent network from the host network;
a first fabric service configured to:
communicate, through the first data port, with a plurality of peer storage nodes over the peer network; and
communicate, through the second data port, with at least one host node over the host network; and
a port forwarding service configured to, responsive to a failure of a connection through the host network to a target storage node in the plurality of peer storage nodes:
receive, through the second data port, a failover storage request for the target storage node; and
forward, through the first data port, the failover storage request to the target storage node, wherein the target storage node is configured to execute the failover storage request.

2. The system of claim 1, wherein the first storage node is configured to:
receive, based on a gateway internet protocol address, the failover storage request through the second data port; and
forward, based on a destination internet protocol address, the failover storage request through the first data port.

3. The system of claim 1, wherein the first storage node further comprises:
a network interface controller comprising:
a storage node processor; and
a storage node memory configured to store, for execution by the storage node processor, the first fabric service and the port forwarding service; and
a plurality of data storage devices configured to receive storage requests through the network interface controller.

4. The system of claim 1, further comprising:
the plurality of peer storage nodes configured to communicate over the peer network using a first network protocol;
the peer network configured to access a first set of data ports in the plurality of peer storage nodes, wherein the peer network is configured as a logically independent network from the host network; and
a host network switch configured to:
connect to a second set of data ports in the plurality of peer storage nodes; and
provide access to the host network for the plurality of peer storage nodes.

5. The system of claim 1, wherein:
the first fabric service is further configured to:
determine a destination address for the failover storage request;
determine that the destination address is not the first storage node; and
forward the failover storage request to the destination address through the first data port; and
the destination address corresponds to a network address for the target storage node on the peer network.

6. The system of claim 1, further comprising a host node, wherein:
the host node comprises:
a host processor;
a host memory;
a host fabric service configured to communicate with the first storage node and the target storage node over the host network; and
a storage service configured to send, over the host network, storage requests to at least one storage device in the target storage node;
a first storage request from the storage service to the target storage node fails; and
the host fabric service is further configured to send, responsive to the first storage request failing, the failover storage request to the first storage node.

7. The system of claim 6, wherein the host fabric service is further configured to:
use a first port identifier corresponding to a host network port of the target storage node for the first storage request; and
use a second port identifier corresponding to the second data port of the first storage node for the failover storage request.

8. The system of claim 7, wherein the host node further comprises a multipath manager configured to:
determine a unique identifier for the target storage node; and
selectively route storage requests to the target storage node using the first port identifier and the second port identifier based on an availability of the host network port corresponding to the first port identifier.

9. The system of claim 1, further comprising a management service configured to:
determine fabric addresses for each storage node of the first storage node and the plurality of peer storage nodes;
determine primary host port identifiers for each storage node of the first storage node and the plurality of peer storage nodes, wherein the primary host port identifier for each storage node corresponds to a host port of the storage node; and
determine at least one failover port identifier for each storage node of the first storage node and the plurality of peer storage nodes, wherein the at least one failover port identifier corresponds to a host port of a different storage node.

10. The system of claim 9, wherein:
the first storage node and the plurality of peer storage nodes are configured as storage blades in an enclosure;
the management service is further configured to:
populate, in at least one host node, a multipath configuration table including primary host port identifiers and at least one failover port identifier for at least one storage node of the first storage node and the plurality of peer storage nodes; and
enable the port forwarding service in each storage node of the first storage node and the plurality of peer storage nodes;

the at least one failover port identifier for the at least one storage node includes a plurality of failover port identifiers selected from the first storage node and the plurality of peer storage nodes;

the at least one host node, the first storage node, and the plurality of peer storage nodes are configured as fabric nodes using a fabric protocol for communication over the host network; and the first storage node and the plurality of peer storage nodes are configured using a peer network protocol that is different from the fabric protocol for communication over the peer network.

11. A computer-implemented method, comprising:

establishing, by a first storage node and through a first data port connected to a peer network, communication with a plurality of peer storage nodes over the peer network;

establishing, by the first storage node and through a second data port connected to a host network, communication with at least one host node over the host network, wherein the peer network is configured as a physically independent network from the host network; and responsive to a failure of a connection through the host network to a target storage node in the plurality of peer storage nodes:

receiving, by the first storage node and through the second data port, a failover storage request for the target storage node; and forwarding, by the first storage node and through the first data port, the failover storage request to the target storage node, wherein the target storage node is configured to execute the failover storage request.

12. The computer-implemented method of claim 11, wherein:

the first storage node receives, based on a gateway internet protocol address, the failover storage request through the second data port; and the first storage node forwards, based on a destination internet protocol address, the failover storage request through the first data port.

13. The computer-implemented method of claim 11, further comprising:

connecting the first storage node and the plurality of peer storage nodes using a first set of data ports for the peer network, wherein the peer network is configured as a logically independent network from the host network; and connecting, to a host network switch, the first storage node and the plurality of peer storage nodes using a second set of data ports for the host network.

14. The computer-implemented method of claim 11, further comprising:

determining, by the first storage node, a destination address for the failover storage request;

determining, by the first storage node, that the destination address is not the first storage node; and forwarding, by the first storage node, the failover storage request to the destination address through the first data port, wherein the destination address corresponds to a network address for the target storage node on the peer network.

15. The computer-implemented method of claim 11, further comprising:

sending, from a host node, a first storage request to at least one storage device in the target storage node;

determining, by the host node, a failure of the first storage request to the target storage node; and sending, by the host node and responsive to the failure of the first storage request, the failover storage request to the first storage node.

16. The computer-implemented method of claim 15, wherein:

sending the first storage request uses a first port identifier corresponding to a host network port of the target storage node; and sending the failover storage request uses a second port identifier corresponding to the second data port of the first storage node for the failover storage request.

17. The computer-implemented method of claim 16, further comprising:

determining, by the host node, a unique identifier for the target storage node; and selectively routing, by the host node, storage requests to the target storage node using the first port identifier and the second port identifier based on an availability of the host network port corresponding to the first port identifier.

18. The computer-implemented method of claim 11, further comprising:

determining fabric addresses for each storage node of the first storage node and the plurality of peer storage nodes;

determining primary host port identifiers for each storage node of the first storage node and the plurality of peer storage nodes, wherein the primary host port identifier for each storage node corresponds to a host port of the storage node; and determining at least one failover port identifier for each storage node of the first storage node and the plurality of peer storage nodes, wherein the at least one failover port identifier corresponds to a host port of a different storage node.

19. The computer-implemented method of claim 18, further comprising:

populating, in at least one host node, a multipath configuration table including primary host port identifiers and at least one failover port identifier for at least one storage node of the first storage node and the plurality of peer storage nodes; and enabling a port forwarding service in each storage node of the first storage node and the plurality of peer storage nodes.

20. A storage system, comprising:

a plurality of peer storage nodes configured to communicate with each other peer storage node of the plurality of peer storage nodes using:

a peer network; and a first set of data ports in the plurality of peer storage nodes, wherein the first set of data ports are configured to connect to the peer network;

at least one host node configured to communicate with the plurality of peer storage nodes using:

a host network, wherein the peer network is configured as a physically independent network from the host network; and a second set of data ports in the plurality of peer storage nodes, wherein the second set of data ports are configured to connect to the host network;

means for sending, from the at least one host node, a storage request to a target storage node of the plurality of peer storage nodes;

means for determining a failure of a connection through the host network to the target storage node for the storage request;

means for sending, responsive to the failure of the connection through the host network to the target storage node, a failover storage request to a different storage node of the plurality of peer storage nodes;

means for receiving, by the different storage node of the plurality of peer storage nodes and over the host network, the failover storage request for the target storage node in the plurality of peer storage nodes; and means for forwarding, by the different storage node and over the peer network, the failover storage request to the target storage node, wherein the target storage node is configured to execute the failover storage request.

* * * * *